United States Patent
Kane et al.

(10) Patent No.: US 11,174,910 B2
(45) Date of Patent: Nov. 16, 2021

(54) REMOTE OPTICAL SENSOR WITH OPTICAL FIBER FOR BRAKE CONDITION MONITORING

(71) Applicant: INTERNATIONAL BUSINESS MACHINES CORPORATION, Armonk, NY (US)

(72) Inventors: Michael Kane, Hopewell Junction, NY (US); Tyler Newman, Wappingers Falls, NY (US); Ryan Mulhern, Mahopac, NY (US); Tadd Bindas, Ringoes, NJ (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 16/575,499

(22) Filed: Sep. 19, 2019

(65) Prior Publication Data

US 2021/0088094 A1   Mar. 25, 2021

(51) Int. Cl.
| | |
|---|---|
| *F16D 66/02* | (2006.01) |
| *G01B 11/30* | (2006.01) |
| *G01B 5/00* | (2006.01) |
| *B60T 17/22* | (2006.01) |

(52) U.S. Cl.
CPC .......... *F16D 66/028* (2013.01); *B60T 17/221* (2013.01); *F16D 66/027* (2013.01); *G01B 5/0028* (2013.01); *G01B 11/303* (2013.01)

(58) Field of Classification Search
CPC ... F16D 66/028; F16D 66/027; G01B 11/303; G01B 5/0028; B60T 17/221
See application file for complete search history.

(56) References Cited

U.S. PATENT DOCUMENTS

| | | |
|---|---|---|
| 3,691,640 A | 9/1972 | McFarland |
| 4,184,145 A | 1/1980 | Fima |
| 6,257,374 B1 | 7/2001 | Strzelczyk |
| 6,302,241 B1 | 10/2001 | Gronowicz, Jr. |

(Continued)

FOREIGN PATENT DOCUMENTS

WO   2018022615 A1   2/2018

OTHER PUBLICATIONS

Fiberguide Industries, "High Temperature Fiber", https://www.fiberguide.com/product/high-temperature-fiber/, printed May 29, 2019, pp. 1-3.

(Continued)

*Primary Examiner* — Pamela Rodriguez
(74) *Attorney, Agent, or Firm* — Tihon Poltavets

(57) ABSTRACT

An apparatus for monitoring condition of a braking system includes a brake pad with a friction material, a plurality of light transmission fibers, and a plurality of optical image fibers. A first end of each of the plurality of light transmission fibers coupled to one or more light emitting-diodes and a second end of each of the plurality of light transmission fibers directed towards a contact surface of the brake rotor. A first end of each of the plurality of optical image fibers coupled to an image sensor and a second end of each of the plurality of optical image fibers directed towards the contact surface of the brake rotor, where the plurality of light transmission fibers and the plurality of optical image fibers are configured to capture an image of at least a section of the contact surface of the brake rotor.

19 Claims, 8 Drawing Sheets

(56) References Cited

U.S. PATENT DOCUMENTS

| | | |
|---|---|---|
| 6,457,566 B1 | 10/2002 | Toby |
| 6,460,659 B1 | 10/2002 | Schaffer |
| 7,437,917 B1 | 10/2008 | McNaughton |
| 9,206,870 B2 | 12/2015 | Lange |
| 9,482,301 B2 | 11/2016 | Lamkin |
| 9,644,696 B2 * | 5/2017 | Eden .................... F16D 66/024 |
| 2009/0229357 A1 | 9/2009 | Kitchen |
| 2019/0128352 A1 | 5/2019 | Jain |

OTHER PUBLICATIONS

Laser Photonics, White Paper, "Image Processing in the Automotive Industry", Jun. 22-25, 2015, Messe Munchen, Germany, pp. 1-16.

LEDs Magazine, "LEDs and sensing technology enable new ranging applications", https://www.ledsmagazine.com/articles/print/volume-11/issue-6/features/developer-forum/leds-and-sensing-technology-enable-new-ranging-applications.html, Jul. 22, 2014, pp. 1-2.

Mell et al., "The NIST Definition of Cloud Computing", National Institute of Standards and Technology, Special Publication 800-145, Sep. 2011, pp. 1-7.

Science Alert, "A Real-time and Cost-Effective Image Processing System for Quality Assurance of Sheet Materials", Information Technology Journal, https://scialert.net/fulltext/?doi=itj.2014.683.689, printed May 29, 2019, vol. 13 pp. 683-689.

* cited by examiner

REMOTE OPTICAL SENSOR WITH OPTICAL FIBER FOR BRAKE CONDITION MONITORING

BACKGROUND OF THE INVENTION

This disclosure relates generally to braking system, and in particular, to a structure for monitoring brake pad and rotor condition with a remote optical sensor and optical fiber.

Safe operation of motorized vehicles and industrial equipment is dependent upon key components being properly maintained to ensure the operating condition of the key components remains optimal. Though most motorized vehicles and industrial equipment have manufacturer specified service interval, unforeseen conditions or situations can damage or accelerate wear of the key components. Braking systems typically utilize a rotor and caliper assembly, where the caliper assembly presses a contact surface of a friction pad (i.e., brake pad) against a contact surface of the rotor to slow a rotational movement of the rotor. An optimal condition of the contact surface of both the rotor and the friction pad ensures that the braking system is operating according to engineering specifications.

SUMMARY

One aspect of an embodiment of the present invention discloses an apparatus for monitoring condition of a braking system, the apparatus comprising a brake pad with a friction material, a first plurality of light transmission fibers, and a first plurality of optical image fibers, wherein the first plurality of light transmission fibers and the first plurality of optical image fibers are positioned on top of a backing plate of the brake pad, wherein the friction material is positioned on top of the backing plate of the brake pad. The apparatus further comprising a first end of each of the first plurality of light transmission fibers coupled to one or more light emitting-diodes and a second end of each of the first plurality of light transmission fibers directed towards a contact surface of the brake rotor. The apparatus further comprising a first end of each of the first plurality of optical image fibers coupled to an image sensor and a second end of each of the first plurality of optical image fibers directed towards the contact surface of the brake rotor, wherein the first plurality of light transmission fibers and the first plurality of optical image fibers are configured to capture an image of at least a section of the contact surface of the brake rotor.

A second aspect of an embodiment of the present invention discloses a method for brake condition monitoring, the method responsive to initializing an image sensor and one or more infrared light emitting-diodes, establishes, by one or more processors, a baseline measurement for each of one or more brake pads and one or more brake rotors utilizing a plurality of light transmission fibers coupled to the one or more infrared light emitting-diodes and a plurality of optical image fibers coupled to the image sensors. The method samples, by one or more processors, each of the one or more brake pads and the each of the one or more brake rotors for assessment. The method processes, by one or more processors, the sample readings for brake pad service projections and brake rotor service projections for each of the one or more brake pads and for each of the one or more brake rotors. The method displays the brake pad service projections and the brake rotor service projections for each of the one or more brake pads and for each of the one or more brake rotor, wherein the brake rotor service projections further include a rotor condition assessment.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which.

DETAILED DESCRIPTION

Figure 1A:
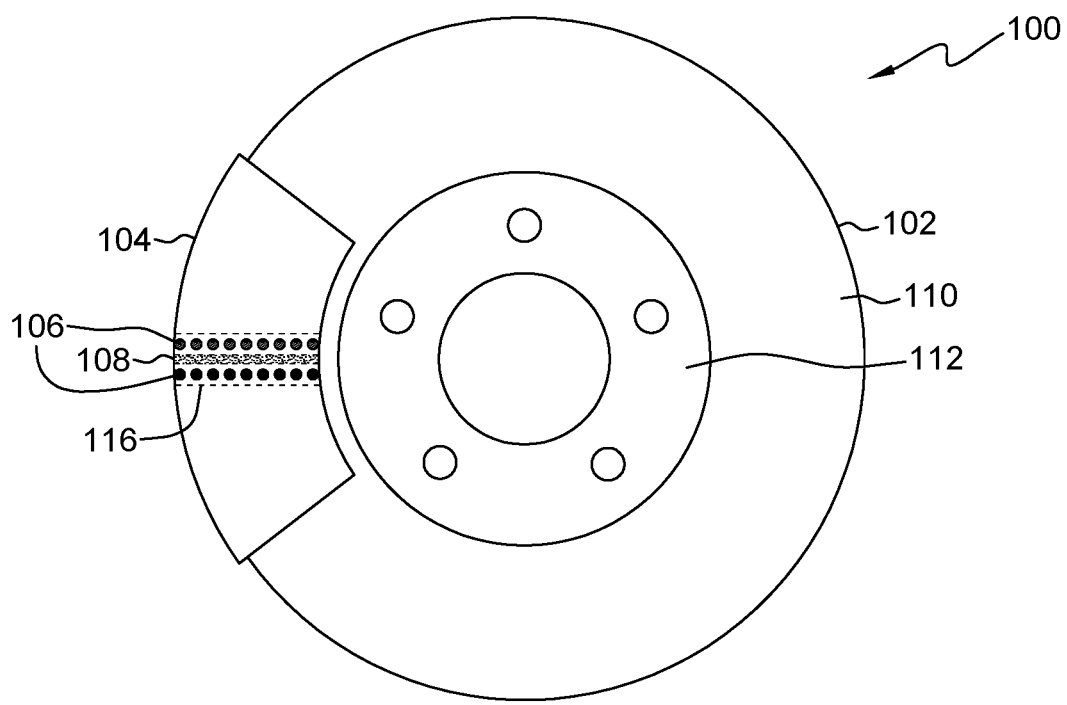
FIG. 1A depicts a front view of a rotor and brake pad with an integrated optical image fiber and light transmission fibers, in accordance with an embodiment of the present invention.

Embodiments of the present invention provide a brake condition monitoring system utilizing brake pads with integrated high temperature optical fiber for remote sensor positioning. A remote image sensor combined with infrared light emitting diodes (IR LEDs) are linked to the brake pads in the brake systems via the optical fiber. A brake condition monitoring program manages the remote image sensors and IR LEDs and provides brake condition information for the brake pads and rotors which is displayed to the operating user (i.e., driver) and/or transmitted via a cloud interface for further analytics and service interval determination. A pulse air cleaning system can be integrated with the optical fiber to ensure the brake pads with the integrated optical image fiber and the light transmission fiber are free from loose debris to ensure the remote image sensor receives an accurate reading from the optical image fiber.

The brake condition monitoring program monitors determines a condition of brake pads based on a thickness of friction material remaining on top of the backing plate of the brake pad. The brake condition monitoring program measures the thickness of the friction material by pulsing the IR LEDs positioned on the backing plate of the brake pad and sampling the image sensor for a Time of Flight measurement between the backing plate and a contact surface of the rotor. The brake condition monitoring program continuous samples the image sensor during a rotation of the rotor and merges the sample of images to construct a scan of the contact surface of the rotor. The brake condition monitoring program can perform image analysis to assess the condition of the contact surface of the rotor and determines if any damage (e.g., grooving, pitting) and/or contaminants (e.g., oil stains, water, iron deposits) are present on the contact surface of the rotor. The brake condition monitoring program can determine a projected remaining life of the brake pads and rotors, a percentage of friction material remaining for the brake pads, and can display a warning when a wear threshold is reached for the brake pads and/or rotors.

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Many common fabrication techniques involve securing two objects using an adhesive layer between the objects. Oftentimes, the adhesive layer is chosen in an attempt to permanently secure the two objects together. And while this adhesive layer selection may be advantageous for typical usage of the overall product, there may be instances where separation of the joined objects is either desired, or necessary. In such instances, separation of the two objects, without physically damaging either of the objects, may be required so that one or both of the objects may be reused.

FIG. 1A depicts a front view of a rotor and brake pad with an integrated optical image fiber and light transmission fibers, in accordance with an embodiment of the present invention. Brake monitoring system 100 includes brake rotor 102 with brake pad 104, where a brake caliper (not illustrated in FIG. 1A) presses brake pad 104 against contact surface 110 of brake rotor 102. In this embodiment, two rows of a plurality of light transmission fibers 106 and a row of a plurality of optical image fibers 108 are positioned within cavity 116 of brake pad 104. A first end of each of the plurality of light transmission fibers 106 is mechanically coupled to one or more infrared light emitting diodes (IR LEDs), where light produced by the one or more IR LEDs enters the first end of each of the plurality of light transmission fibers 106 and exits a second end of each of the plurality of light transmission fibers 106. The second end of each of the plurality of light transmission fibers 106 faces contact surface 110 of brake rotor 102, where the light exiting each of the plurality of light transmission fibers 106 is directed towards contact surface 110 of brake rotor 102. The two rows of the plurality of light transmission fibers 106 are positioned along a portion of a radius of contact surface 110 to cover a sweeping area of contact surface 110 as brake rotor 102 rotors in a clockwise or counterclockwise manner based on a driving force at hub 112.

Similarly, a first end of each of the plurality of optical image fibers 108 is mechanically coupled to one or more image sensors and a second end of each of the plurality of optical image fibers 108 faces contact surface 110 of brake rotor 102. Light exiting the second end of each of the plurality of light transmission fibers 106 reflects off of contact surface 110 of brake rotor 102 and is captured by the second end of each of the plurality of optical image fibers, where the one or more image sensors receive the captured image (i.e., light) at the first end of each of the plurality of optical image fibers 108. The row of the plurality of optical image fibers 108 are positioned along a portion of a radius of contact surface 110 to cover a sweeping area of contact surface 110 as brake rotor 102 rotors in a clockwise or counterclockwise manner based on the driving force at hub 112. The one or more IR LEDs and the one or more image sensors are remotely positioned away from brake rotor 102 and brake pad 104, and are discussed in further detail with regards to FIG. 2.

Figure 1B:
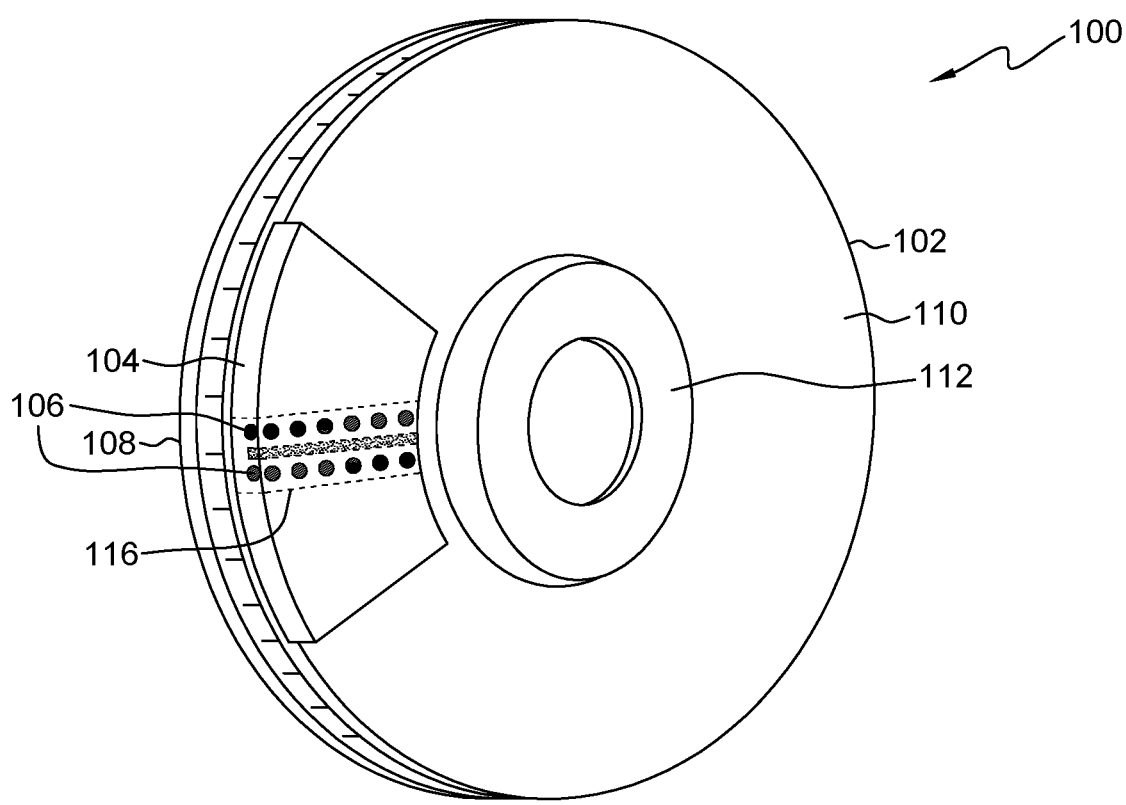
FIG. 1B depicts a 3-dimensional view of a rotor and brake pad with an integrated optical image fiber and light transmission fibers, in accordance with an embodiment of the present invention.

FIG. 1B depicts a 3-dimensional view of a rotor and brake pad with an integrated optical image fiber and light transmission fibers, in accordance with an embodiment of the present invention. Typical brake pads 104 include cavity 116 to allow for brake dust and gases escape the braking system when brake pads 104 are applied to contact surface 110 of rotating braking rotor 102. Brake monitoring system 100 exploits cavity 116 of brake pads 104 by embedding one or more rows of a plurality of light transmission fibers 106 and one or more rows of a plurality of optical image fibers 108. As previously discussed, this embodiment includes two rows of a plurality of light transmission fibers 106 and a single row of a plurality of optical image fibers 108. It is to be noted, a brake wear sensor can be incorporated into brake pad 104 in cavity 116, where the brake wear sensor interacts with contact surface 110 of brake rotor 102 when the brake pads are worn down to a certain thickness. However, some of the disadvantages of utilizing just the brake wear sensor is that rotor condition cannot be monitored with the brake wear sensor and brake condition monitoring program cannot utilize the brake wear sensor to calculate remaining brake life or continuous percentage of wear due to the binary operating nature of the brake wear sensor.

Brake rotor 102 can be made of metal based (e.g., iron) or carbon composite based material. In this embodiment, brake rotor 102 is a single piece design, where contact surface 110 and hub 112 are created as a single mold. In other embodiments, brake rotor 102 is a two piece design, where contact surface 110 is coupled to hub 112 utilizing a plurality of fasteners positioned around the outer circumference of hub 112. As brake rotor 102 experiences numerous heat cycles during operation, brake rotor 102 can experience one or more failures due to defects and/or operating the brake rotor 102 outside of manufacturing specifications. The one or more failures can include scarring, cracking, warping, and excessive rusting. Scarring of brake rotor 102 occurs when a foreign objects (e.g., rock) impacts contact surface 110 and creates a groove (i.e., scar) into contact surface 110. Cracking of brake rotor 102 occurs when the metal based or carbon composite based material experiences thermal stress fractures due to defects in the material or operating outside of manufacturing specifications. Brake condition monitoring program has the ability to identify instances of scarring and cracking by pulsing the one or more IR LEDs, such that the second end of each of the plurality of light transmission fibers lights contact surface 110 as brake rotor 102 rotates. The second end of each of the plurality of optical fibers captures an image of contact surface 110 for each pulse off the one or more IR LEDs and brake condition monitoring program can compile the captured images to generate a single image of contact surface 110 for a single rotation of brake rotor 102. Brake condition monitoring program can compare a current generated image of contact surface 110 for a single rotation of brake rotor 102 with one or more previously generated images of contact surface 110 to identify any newly developed scarring or cracking on contact surface 110 of brake rotor 102.

Warping of brake rotor 102 represents a condition where run-out of contact surface 110 is outside of manufacturing specification. Run-out is typically measured manually utilizing a dial indicator on a fixed and rigid base, where a tip of the dial indicator is perpendicular to contact surface 110. As brake rotor 102 is spun, the dial indicator measures the run-out (i.e., warping) of contact surface 110. Brake condition monitoring program can utilize Time of Flight measurements for each pulse of the one or more IR LEDs, to determine if variations in the Time of Flight measurements exceed a pre-determined threshold. If the Time of Flight measurements exceed the pre-determined threshold, brake condition monitoring program determines the run-out of contact surface 110 of brake rotor 102 exceeds manufacturing specifications and brake rotor 102 requires replacing. Excessive rusting of brake rotor 102 represents excess material buildup (i.e., iron deposit) on contact surface 110, where the excess material buildup cannot be removed with brake pads 104 contacting brake rotor 102. The plurality of optical image fibers 108 have the ability to capture the elevated portions of contact surface 110 due to the excessive rusting and brake condition monitoring program has the ability to highlight the portions of brake rotor 102 where excessive rust is present when generating an image of contact surface 110 for a single rotation of brake rotor 102.

Figure 1C:
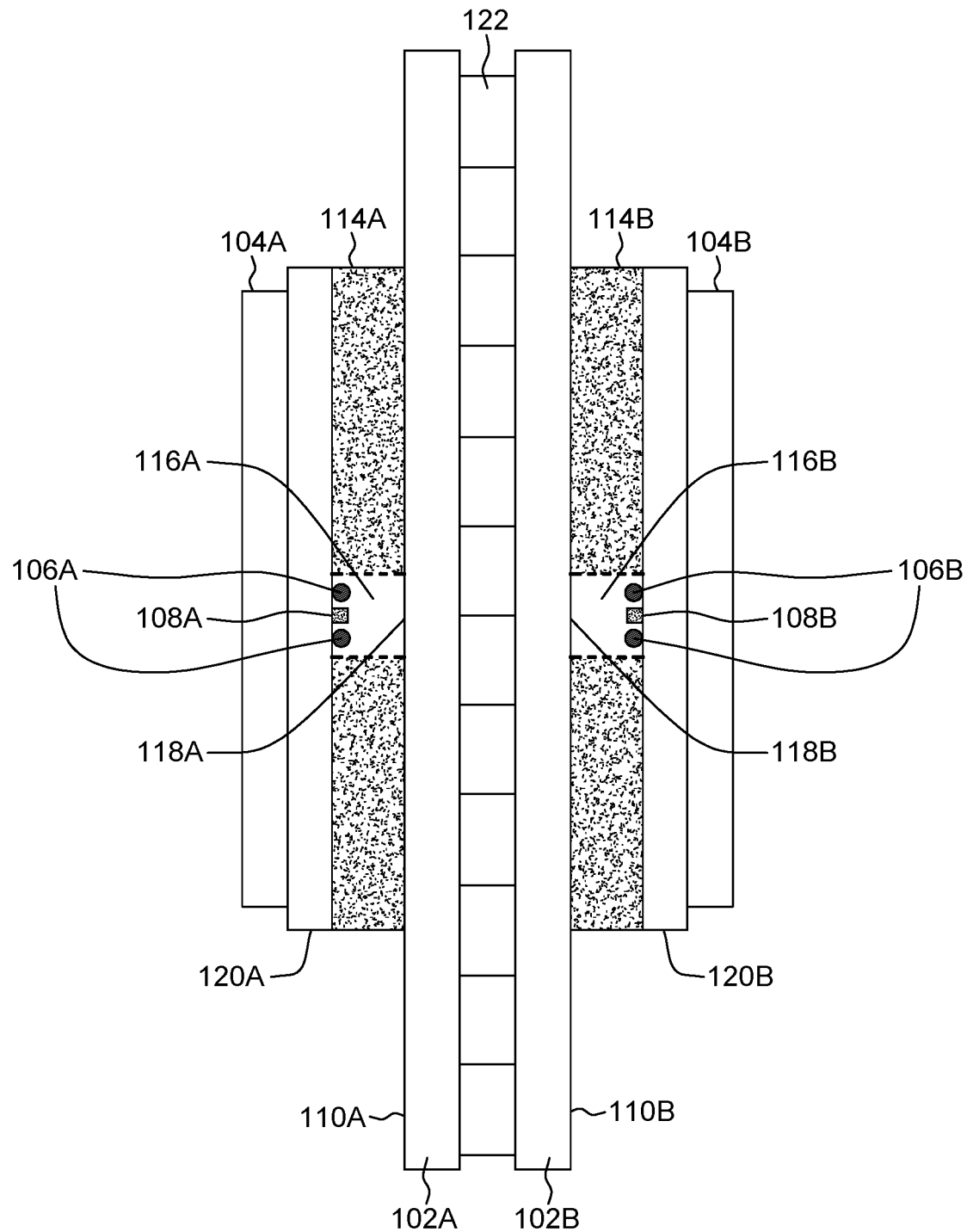
FIG. 1C depicts a side view of a rotor, caliper, and brake pads with an integrated optical image fiber and light transmission fibers, in accordance with an embodiment of the present invention.

FIG. 1C depicts a side view of a rotor, caliper, and brake pads with an integrated optical image fiber and light transmission fibers, in accordance with an embodiment of the present invention. For discussion purposes, reference numbers with designation "A" represent a left side of brake monitoring system 100 and reference with designation "B" represent a right side of brake monitoring system 100. Brake rotor 102 includes a left portion designated brake rotor 102A and a right portion designated brake rotor 102B, where cooling channels 122 separate the left portion and the right portion. Brake pad 104A and 104B respectively include backing plate 120A and 120B, where backing plate 120A and 120B respectively provide a structural support for friction material 114A and 114B. As a brake caliper (not illustrated in FIG. 1C) squeeze brake pads 104A and 104B against brake rotor 102, friction material 114A interacts with contact surface 110A on the left portion of brake rotor 102A and friction material 114B interacts with contact surface 110B on the right portion of brake rotor 102B. A first set of two rows of a plurality of light transmission fibers 106A and a row of a plurality of optical image fibers 108A are positioned within cavity 116A of brake pad 104A and a second set of two rows of a plurality of light transmission fibers 106B and a row of a plurality of optical image fibers 108B are positioned within cavity 116B of brake pad 104B. As a result, brake condition monitoring program has the ability to monitor brake conditions for both brakes pads 104A and 104A, as well as contact surface 110A and 110B of brake rotor 102.

Brake condition monitoring program obtains a Time of Flight measurement by pulsating one or more IR LEDs coupled to the first set and the second set of the two rows of light transmission fibers 106A and 106B and measuring Time of Flight from light transmission fibers 106A and 106B to respective optical image fibers 108A and 108B, where light emitted by light transmission fibers 106A and 106B is reflected off of respective contact surface 110A and 110B back to respective optical image fibers 108A and 108B. Brake condition monitoring program can utilizes the Time of Flight measurement to determine a thickness of friction material 114A and 114B of brake pad 104A and 104B, respectively. In some embodiments, light transmission fibers 106 and optical image fibers 108 can protrude a distance from backing plate 120 and brake condition monitoring program can incorporate the distance of protrusion when determining the thickness of the friction material.

For a generated image of contact surface 110 of brake rotor 102, brake condition monitoring program can compile the captured images associated with every IR LED pulse to generate the single image of contact surface 110 during a single 360 degree rotation of brake rotor 102. Area 118 on contact surface 110 represents a captured image of contact surface 110. In this embodiment, a capture image of area 118 is equal to 5 degrees of a complete 360 degrees rotation of contact surface 110. Therefore, 72 captured images and 72 pulses of the IR LEDs are required for brake condition monitoring program to generate a single image of contact surface 110 on brake rotor 102. Dimensions of area 118 in the capture image dictate how many captured images are required for brake condition monitoring program to generate a single image of contact surface 110. In other embodiment. brake condition monitoring program has the ability to capture images over two or more 360 degree rotations of brake rotor 102 to generate a single image of contact surface 110.

Figure 2:
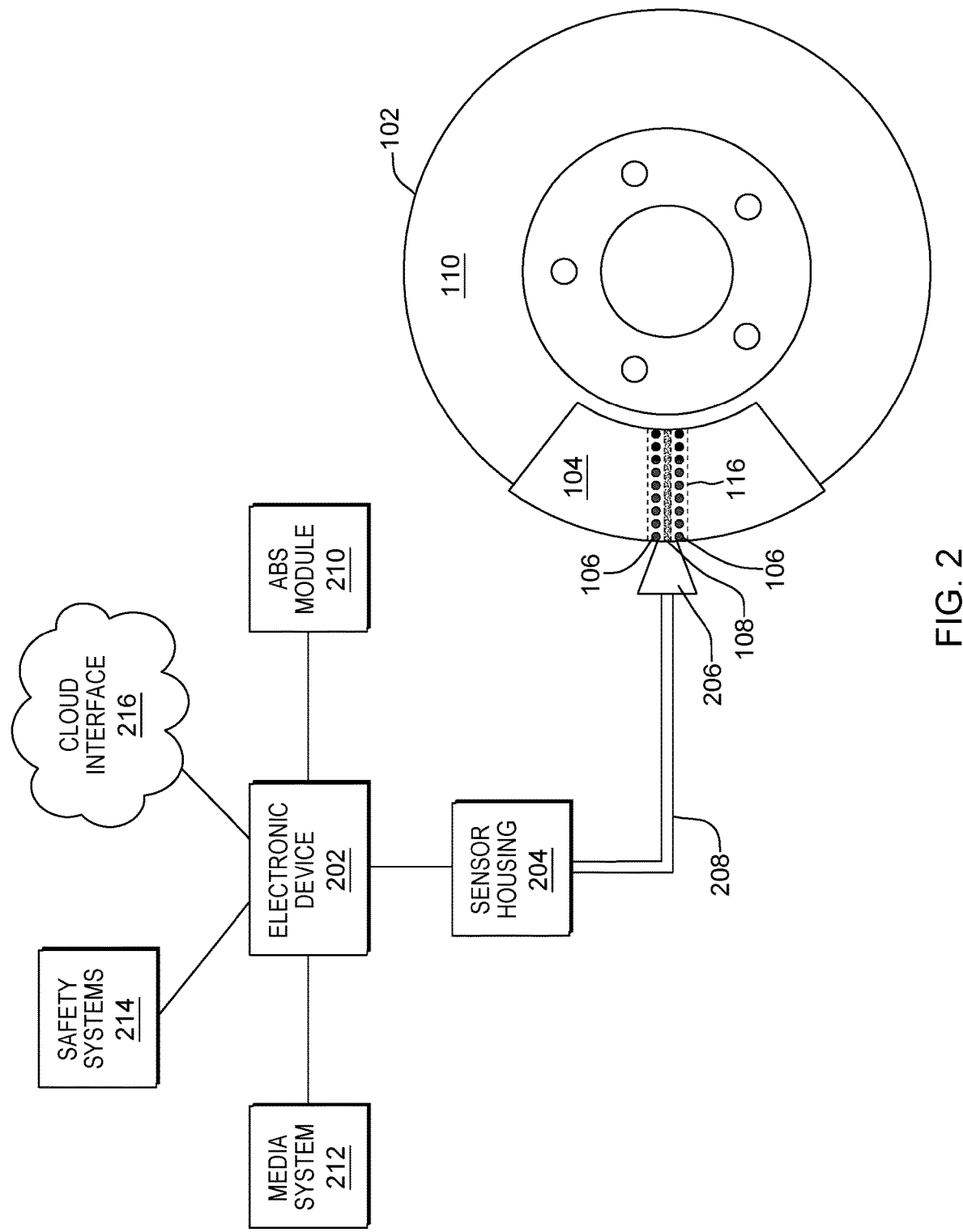
FIG. 2 depicts an example of a system for operating a remote optical sensor with integrated optical image fiber and light transmission fibers, in accordance with an embodiment of the present invention.

FIG. 2 depicts an example of a system for operating a remote optical sensor with integrated optical image fiber and light transmission fibers, in accordance with an embodiment of the present invention. In this embodiment, a first end of each of the plurality of light transmission fibers 106 is coupled to one or more infrared light emitting diodes (IR LEDs) located in sensor housing 204, where light produced by the one or more IR LEDs enters the first end of each of the plurality of light transmission fibers 106 and exits a second end of each of the plurality of light transmission fibers 106. The second end of each of the plurality of light transmission fibers 106 faces contact surface 110 of brake rotor 102, where the light generated by the one or more IR LEDs exiting the second end of each of the plurality of light transmission fibers 106 is directed towards contact surface 110 of brake rotor 102. A first end of each of the plurality of optical image fibers 108 is coupled to one or more image sensors located in sensor housing 204 and a second end of each of the plurality of optical image fibers 108 faces contact surface 110 of brake rotor 102. Light exiting the second end of each of the plurality of light transmission fibers 106 reflects off of contact surface 110 of brake rotor 102 and is captured by the second end of each of the plurality of optical image fibers, where the one or more image sensors in sensor housing 204 receive the captured image (i.e., light) at the first end of each of the plurality of optical image fibers 108. In this embodiment, there are a total of 18 second ends of light transmission fibers in cavity 116 and a total of 14 second ends of optimal image fibers in cavity 116.

Lines 208 house light transmission fibers 106, optical image fibers 108, and an air tube for directing pulses of compressed air via nozzle 206 into cavity 116 housing the second end of each of the plurality of light transmission fibers 106 and optical image fiber 108. Nozzle 206 and the air tube integrated into lines 208 are part of a pulse air cleaning system to ensure brake pads 102 with light transmission fibers 106 and optical image fibers 108 are free from loose debris to ensure the one or more image sensors located in sensor housing 204 receives an accurate and clear image of contact surface 110. Sensor housing 204 is connected to electronic device 202, where electronic device 202 operates brake condition monitoring program 306 (discussed in further detail with regards to FIG. 3). Electronic device 202 is connected to anti-locking braking system (ABS) module 210, media system 212, safety systems 214, and cloud interface 216 (discussed in further detail with regards to FIG. 3).

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

Figure 3:
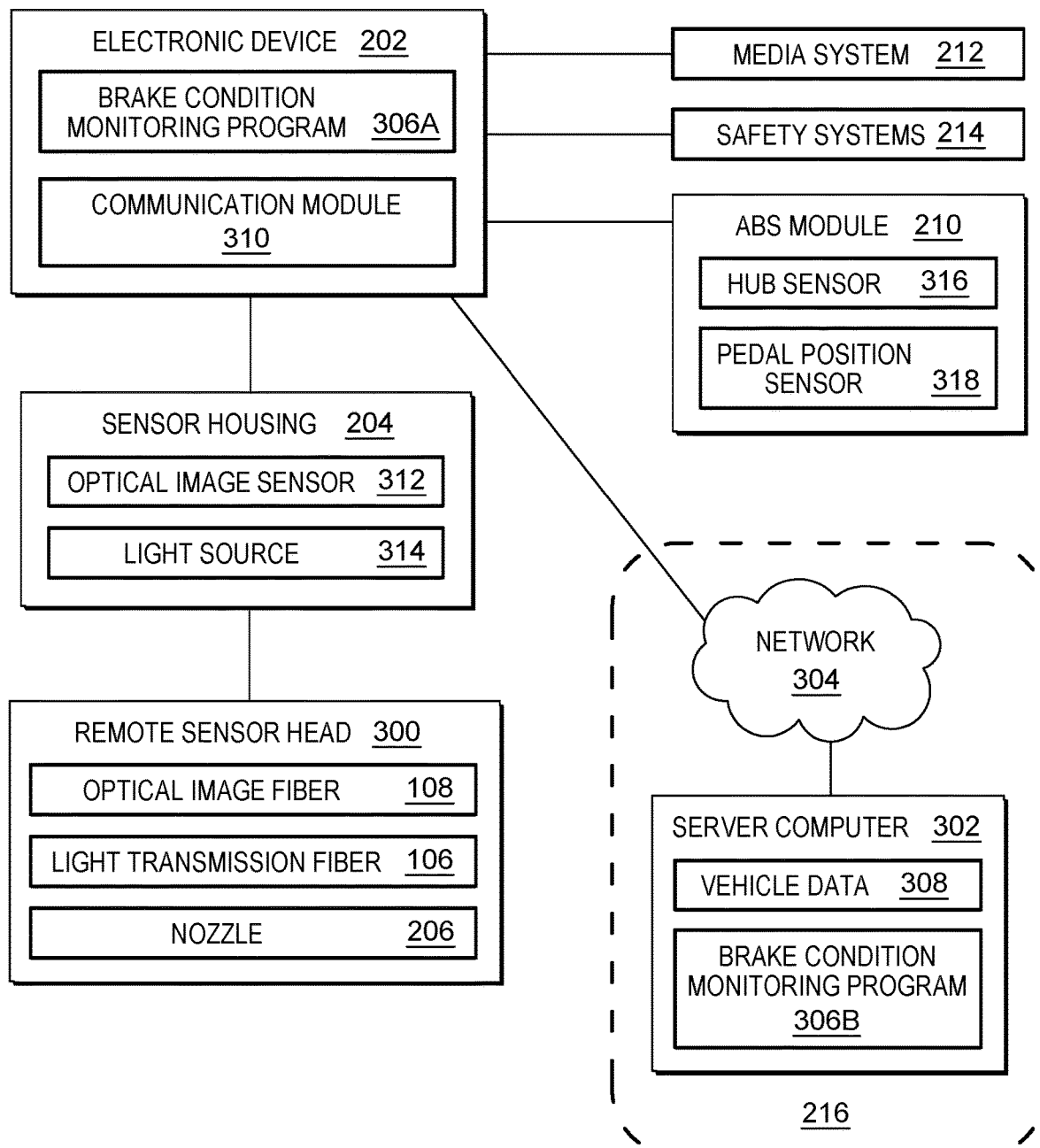
FIG. 3 is a functional block diagram illustrating a distributed data processing environment for operating a brake condition monitoring program, in accordance with an embodiment of the present invention.

FIG. 3 is a functional block diagram illustrating a distributed data processing environment for operating a brake condition monitoring program, in accordance with an embodiment of the present invention.

Electronic device 202 may be a microprocessor, a microcontroller, or any computing device capable of operating brake condition monitoring program 306A and communication module 310. In general, electronic device 202 is representative of any programmable electronic device or combination of programmable electronic devices capable of executing machine-readable program instructions and communicating with users of other electronic devices via network 304. Electronic device 202 may include components, as depicted and described in further detail with respect to FIG. 5, in accordance with embodiments of the present invention. In this embodiment, brake condition monitoring program 306A operating on electronic device 202 represents a user side (i.e., vehicle operator) based brake condition monitoring program 306.

Communication module 310 allows for brake condition monitoring program 306A to interact with brake condition monitoring program 306B on server computer 302 via network 304. Electronic device 202 can include a user interface to allow for a user (i.e., vehicle operator) to interact with brake condition monitoring program 306A. Alternatively, the user can interact with brake condition monitoring program 306A on electronic device 202 via media system 212, where media system 212 represents an audio and/or visual based electronic system capable of relaying information from brake condition monitoring program 306A to the operator of the vehicle. Additionally, media system 212 has the ability to display brake pad and brake rotor assessment and service projections determined by brake condition monitoring program 306A and information produced by safety system 214. Safety systems 214 include but is not limited to radar based cruise control, cross-traffic alert, lane keep assist, and any other assisted driving systems utilizing the braking system (i.e., brake pads and brake rotors) to assist the user operating the vehicle.

Server computer 302 may be a specialized computer server or any computer system capable of executing the various embodiments of brake condition monitoring program 306B. In certain embodiments, server computer 302 represents a computer system utilizing clustered computers and components that act as a single pool of seamless resources when accessed through network 304, as is common in data centers and with cloud computing applications. In general, server computer 302 is representative of any programmable electronic device or combination of programmable electronic devices capable of executing machine-readable program instructions and communicating with other computer devices via a network. In this embodiment, server computer 302 has the ability to communicate with other computer devices (e.g., electronic device 202) to query the computer devices for information. Server computer 302 includes brake condition monitoring program 306B and vehicle data 308. In this embodiment, brake condition monitoring program 306B represents a server side based brake condition monitoring program 306.

Vehicle data 308 on server computer 302 includes brake condition information for a vehicle that brake condition monitoring program 306A collects and determines. Brake condition information can include remaining depth of friction material on brake pads, brake rotor condition (e.g., scarring, cracking, warping, and excessive rusting), percentage of friction material remaining on the brake pads, service projections for the braking systems, and estimated time of service based on brake pad and brake rotor wear.

Sensor housing 204 includes optical image sensor 312 and light source 314. Optical image sensor 312 is coupled to receive information from a first end of optical image fiber 108, previously discussed with regards to FIG. 3. Optical image sensor 312 represents a sensor that detects and conveys information utilized by brake condition monitoring program 306A to generate an image of contact surface on brake rotor. In this embodiment, light source 314 represents one or more infrared light-emitting diodes (IR LEDs), where light source 314 is coupled to transfer light to a first end of light transmission fiber 106. Remote sensor head 300 includes light transmission fiber 106, optical image fiber 108, and nozzle 206 of a pulse air cleaning system. Remote sensor head 300 is positioned at within a cavity of every brake pad in the braking system. In one embodiment, a vehicle with four brakes rotors utilizes a brake pad set that includes eight separate brake pads, where two brake pads from the brake pad set are associated with each brake rotor. Remote sensor head 300 is positioned in each of the eight brake pads from the brake pad sets, where brake condition monitoring program 306A collects brake pad condition information for each brake pad from the brake pad set. Furthermore, brake condition monitoring program 306A collects brake rotor condition information for each of the four brake rotors, where the brake rotor condition information for each brake rotors includes two contact surfaces.

In other embodiments, remote sensor head 300 is positioned in only two brake pads from the brake pad sets, where brake condition monitoring program 306A collects brake pad condition information for a brake pad associated with a brake rotor located on a front axle and a brake pad associated with a brake rotor located on a rear axle. A quantity of remote sensor heads 300 utilized is dependent on an application (e.g., industrial usage) and an operating environment (e.g., high temperature, dust, and debris) of a vehicle for which brake condition monitoring program 306A monitors a brake system.

ABS module 310 includes hub sensor 316 and pedal position sensor 318. Hub sensor 316, also referred to as an ABS sensor, monitors a rotational speed of a brake rotor. Pedal position sensor 318 in drive by wire applications monitors an amount of pedal travel, where pedal position sensor 318 is associated with a brake pedal in the braking system. Brake condition monitoring program 306A can utilize information received by hub sensor 316 to determine a position of a brake rotor relative to completing a 360 degree rotation from which an image of the contact surface of the brake rotor is generated. Brake condition monitoring program 306A can utilize pedal position sensor 318 to determine when the brake pads are pressed against the contact surface of the brake rotor to establish baseline measurements for the brake pads.

In general, network 304 can be any combination of connections and protocols that will support communications between electronic device 202 and server computer 302. Network 304 provides brake condition monitoring program 306A with cloud interface 216 to which vehicle data 308 can be uploaded to from electronic device 202. Network 304 can include, for example, a local area network (LAN), a wide area network (WAN), such as the internet, a cellular network, or any combination of the preceding, and can further include wired, wireless, and/or fiber optic connections. In one embodiment, brake condition monitoring program 306B can be a web service accessible via network 304 to a user of electronic device 202. In another embodiment, brake condition monitoring program 306B may be operated directly by a user of server computer 302.

Figure 4:
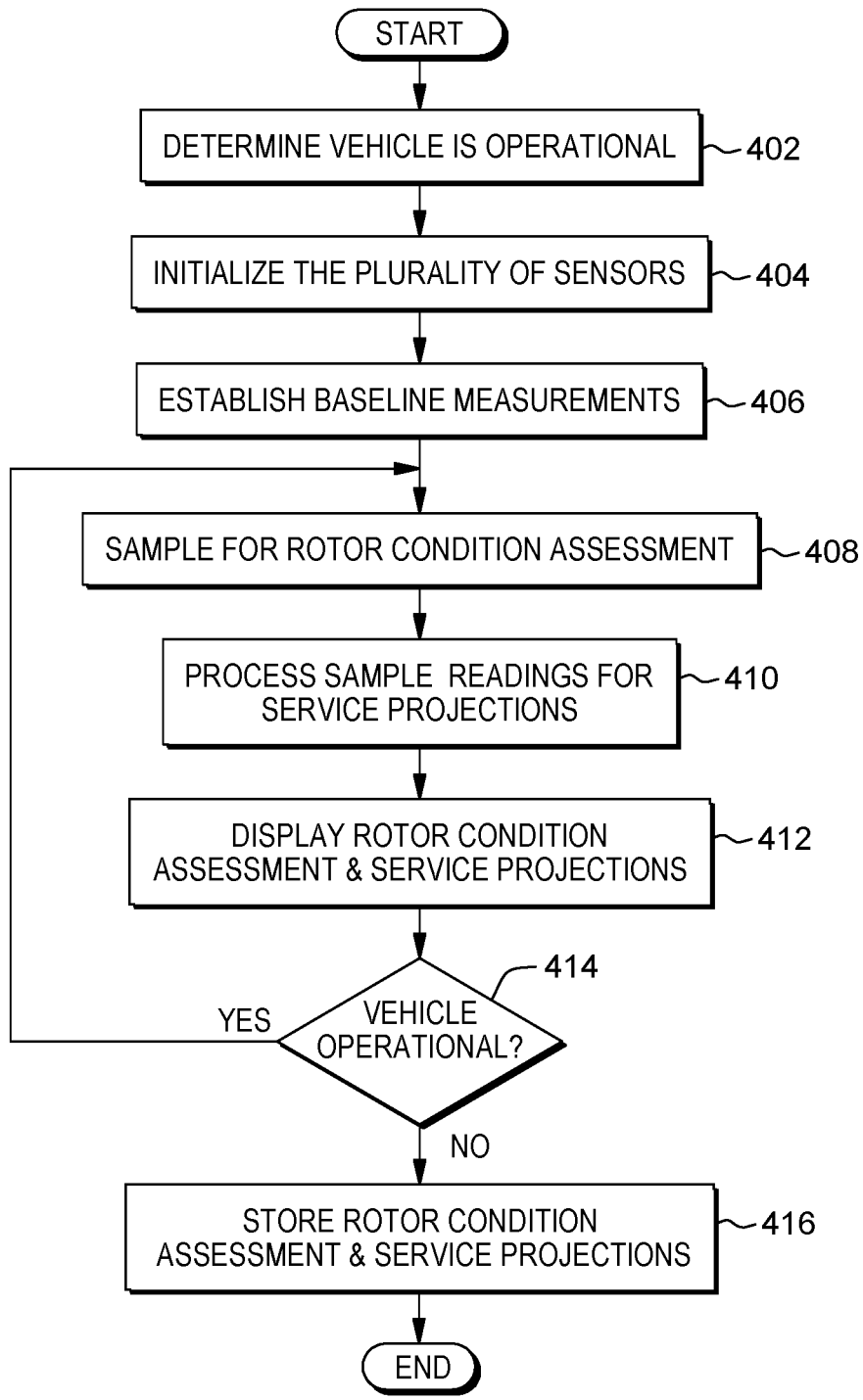
FIG. 4 is a flowchart depicting operational steps of a brake condition monitoring program for determining a rotor and brake pad conditions, in accordance with an embodiment of the present invention.

FIG. 4 is a flowchart depicting operational steps of a brake condition monitoring program for determining a rotor and brake pad conditions, in accordance with an embodiment of the present invention.

Brake condition monitoring program determines (402) a vehicle is operational. In this embodiment, the vehicle is a personal automobile, where the vehicle is operational when an operator depresses the brake pedal and initializes the vehicle into an accessory mode via a start/stop button or ignition key. For certain electrical vehicles, depressing the brake pedal places the vehicle into the accessory mode, without requiring an action via the start/stop button or ignition key. The accessory mode represents a state where power is provided to all the electronic components on the vehicle, prior to vehicle being placed into a driving gear (e.g., forward or reverse). In another embodiment, the vehicle is an aircraft, where the vehicle is operational when an operator turns on auxiliary power unit prior to igniting one or more engines and the brake is applied to the landing gear.

Brake condition monitoring program initializes (404) the plurality of sensors. Brake condition monitoring program initializes the plurality of sensors by checking connectivity with the sensor housing and the one or more remote sensor heads with the light transmission fibers and the optical image fibers. Responsive to brake condition monitoring program determining connectivity cannot be established with one or more of the sensor housing and/or the one or more remote sensor heads, brake condition monitoring program can display a notification identifying the one or more of the sensor housing and/or the one or more remote sensor heads experiencing connectivity issues. Furthermore, brake condition monitoring program initializes the plurality of sensors by checking values generated by the sensor housing with the one or more remote sensor heads with the light transmission fibers and the optical image fibers. If one or more values produced by the one or more remote sensor heads are outside of an operating range, brake condition monitoring program identifies the one or more values as an anomaly and brake condition monitoring program can display a notification identifying the one or more remote sensor heads experiencing the anomaly with the one or more values outside of the operating range.

Brake condition monitoring program establishes (406) baseline measurements. To establish baseline measurements for friction material depth on a brake pad, brake condition monitoring program requires the brakes be applied, so that the brake pads interact with the contact surface of the brake rotor. In one embodiment, when the operator depresses the brake pedal to initialize (i.e., start) the vehicle, brake condition monitoring program establishes the baseline measurement for the friction material depth on the brake pad by pulsating the one or more IR LEDs and utilizing Time of Flight techniques to determine the friction material depth. As previously discussed, brake condition monitoring program measures the thickness of the friction material by pulsing the IR LEDs positioned on the backing plate of the brake pad and sampling the image sensor for a Time of Flight measurement between the backing plate and a contact surface of the rotor, where the backing plate includes the light transmission fiber and the optical image fiber. In another embodiment, brake condition monitoring program utilizes the ABS module to depress the brakes, so that the brake pads interact with the contact surface of the brake rotor. Subsequently, brake condition monitoring program establishes the baseline measurement for the friction material depth on the brake pad by utilizing the Time of Flight technique discussed above. In yet another embodiment, brake condition monitoring program displays a notification to the operator of the vehicle to depress the brake to allow for brake condition monitoring program to establish the baseline measurement for the friction material depth on the brake pad by utilizing the Time of Flight technique discussed above.

To establish baseline measurements for the contact surface of the brake rotor, brake condition monitoring program generates a single image of a contact surface of the brake rotor during an initial rotation of the brake rotor. Brake condition monitoring program captures multiple images of portions of the contact surface of the brake rotor during the initial rotation, compiles the multiples images of the portions of the contact surface, and generates the single image for the contact surface of the rotor as the baseline measurement. Brake condition monitoring program can utilize the ABS module and the hub sensor associated with each brake rotor to determine a sampling rate to gather the multiples images of the portions of the contact surface the brake rotor. Brake condition monitoring program performs an initial assessment of the contact surface of the brake rotor to identify instances of scarring, cracking, warping, and excessive rusting to determine a sampling rate to gather the multiples images of the portions of the contact surface the brake rotor can store the baseline measurements for the brake pads and the brake rotor, along with the generated single image of the brake rotor on a remote server via a cloud interface for evaluation by a manufacturer, Brake condition monitoring program samples (408) for rotor condition assessment. While the vehicle is operational, brake condition monitoring program utilizes the ABS module and the hub sensor associated with each brake rotor to determine a sampling rate to gather the multiples images of the portions of the contact surface the brake rotor. Brake condition monitoring program can perform this sampling continuously as the vehicle is in motion or in set time intervals (e.g., every 5 minutes). Brake condition monitoring program can alter the set time intervals for the sampling depending on detected environmental conditions including but not limited to ambient temperature, humidity, visibility distances, and precipitation levels. For example, brake condition monitoring program can reduce the set time interval for the sampling to one minute for higher ambient temperature, since the high temperature condition is not ideal for brake pads and brake rotors to properly cool during usage. In another example, if a rain sensor on a vehicle detects high precipitation levels, brake condition monitoring program can reduce the set time interval for the sampling to one minute due to the potential of fluid (i.e., rainwater) buildup between the contact surface of the brake rotor and the friction material of the brake pad. Furthermore, a pulse air cleaning system can direct pulses of compressed air via a nozzle towards the plurality of light transmission fibers and the plurality of optical image fibers in the cavity of each brake pad.

Brake condition monitoring program processes (410) sample readings for service projections. For processing the sample readings of the brake rotor, brake condition monitoring program compiles the multiples images of the portions of the contact surface and generates a current image for the contact surface of the brake rotor. Brake condition monitoring program compares the current generated image of the contact surface of the brake rotor to the previously generated image of the contact surface of the brake rotor, utilized as the baseline measurement for the brake rotor. Brake condition monitoring program can identify any new instances of scarring, cracking, warping, and excessive rusting, relative to the previously performed initial assessment. For processing sample readings of the brake pads, brake condition monitoring program can utilize the Time of Flight techniques when brakes are applied during the sampling process for the brake rotor condition to determine friction material depth on the brake pad. Brake condition monitoring program can compare the sampled measurement with the previously established baseline measurement for the friction material depth on the brake pad and determine a depth change and/or percentage change in friction material depth on the brake pad due to wear.

Brake condition monitoring program displays (412) rotor condition assessment and service projections. Brake condition monitoring program can display results for the brake rotor condition assessment and service projections to the user (i.e., vehicle operator) in a user interface of a media system. Brake condition monitoring program can display a simplified and/or a detailed brake rotor condition assessment to the user, to allow for the user to either quickly view an overall result (e.g., "Status: Ok", "Status: Attention Required") or to allow for the user to view a detailed result of the assessment with the generated image of the brake rotor. For the detailed result of the assessment, brake condition monitoring program displays the generated image of the brake rotor and can highlight one or more areas of the contact surface of the brake rotor where instances of potential scarring, cracking, warping, and excessive rusting have been detected. Furthermore, brake condition monitoring program can determine a severity of the instance of potential scarring, cracking, warping, and excessive rusting and display a service projection (e.g., 30,000 miles or "service now") of how long the brake rotors can last based on the severity of the instance of potential scarring, cracking, warping, and excessive rusting.

Brake condition monitoring program can also display a remaining friction material depth for each of the brake pads (e.g., 6 mm friction material friction material), a percentage of remaining friction material depth for each of the brake pads (e.g., 25% friction material friction material), and identify one or more brake pads experiencing abnormal wear relative to the other brake pads being monitored (e.g., 6 mm vs 9 mm friction material remaining). Brake condition monitoring program can determine a rate of friction material wear for the brake pads based on mileage traveled and display a service projection of how long the brake pads should last (e.g., 10,000 miles) until the brake pads require servicing and/or replacing.

Brake condition monitoring program determines (decision 414) if the vehicle is still operational. In the event brake condition monitoring program determines the vehicle is no longer operational ("no", decision 414), brake condition monitoring program stores (418) rotor condition assessment and service projections. In the event brake condition monitoring program determines the vehicle is still operational ("yes", decision 414), brake condition monitoring program reverts back to sample for rotor condition assessment (408).

Brake condition monitoring program stores (416) rotor condition assessment and service projections. Brake condition monitoring program has the ability to utilize a cloud interface to send the rotor condition assessment and service projections to a server computer for storage and further analysis by a manufacturer. Brake condition monitoring program can store the rotor condition assessment and service projections based on brake rotor and brake pad part numbers, where each stored rotor condition assessment and service projection is associated with a specific vehicle identifiable via a vehicle identification number (VIN). Brake condition monitoring program can utilizes the stored rotor condition assessment and service projections to identify potential manufacturing defects for instance of abnormal wear in brake pads or instances of potential scarring, cracking, warping, and excessive rusting in brake rotors based on specific part numbers. Furthermore, brake condition monitoring program can utilize the stored rotor condition assessment and service projections to manage and predict future service trends to repair and/or replace the brake rotors and brake pads.

Figure 5:
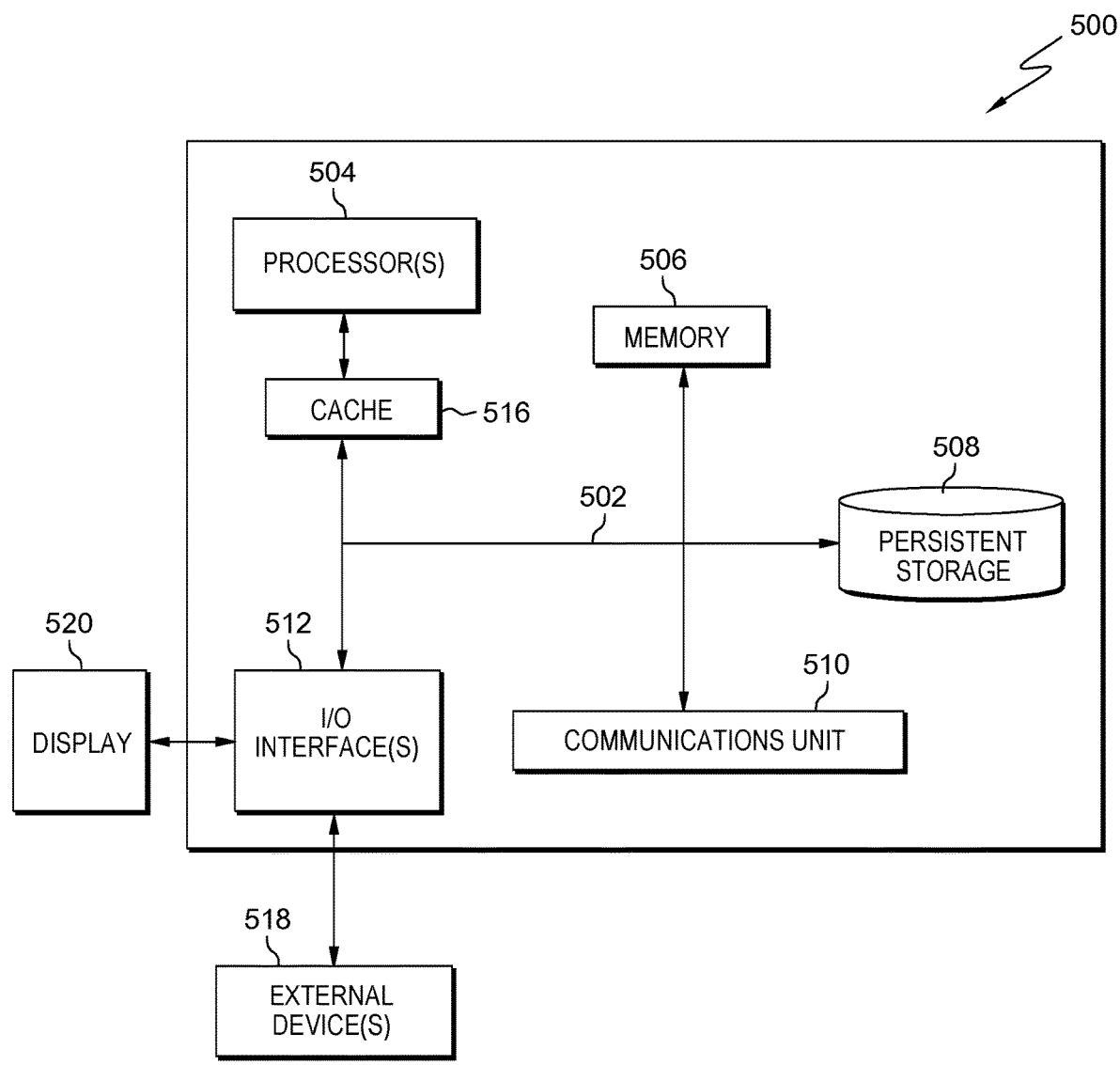
FIG. 5 depicts a block diagram of components of a computer system for performing the operational steps of the brake condition monitoring program, in an embodiment, in accordance with the present invention.

FIG. 5 depicts a block diagram of components of a computer system for performing the operational steps of the brake condition monitoring program, in an embodiment, in accordance with the present invention. The computer system includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
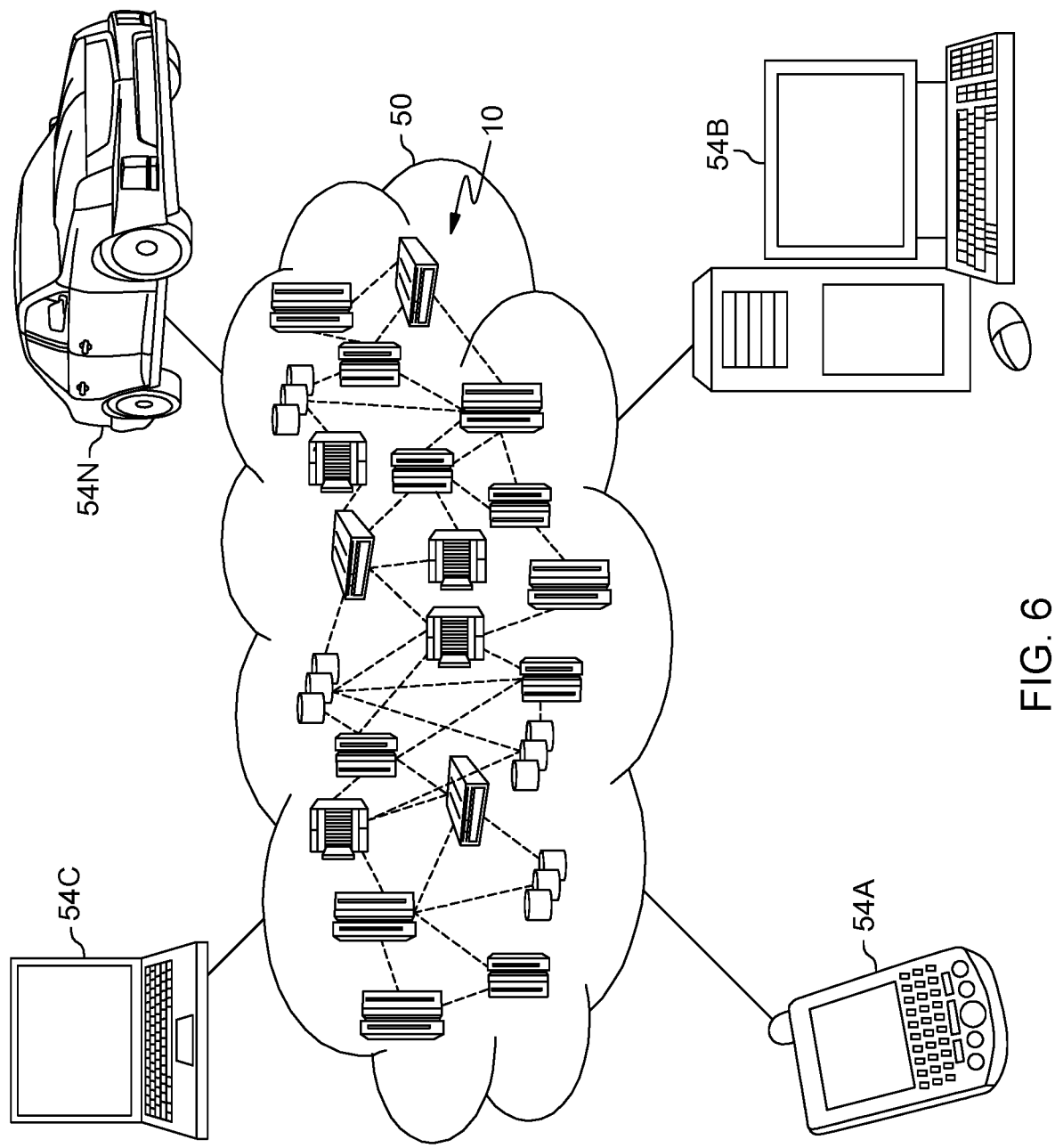
FIG. 6 depicts a cloud computing environment, in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
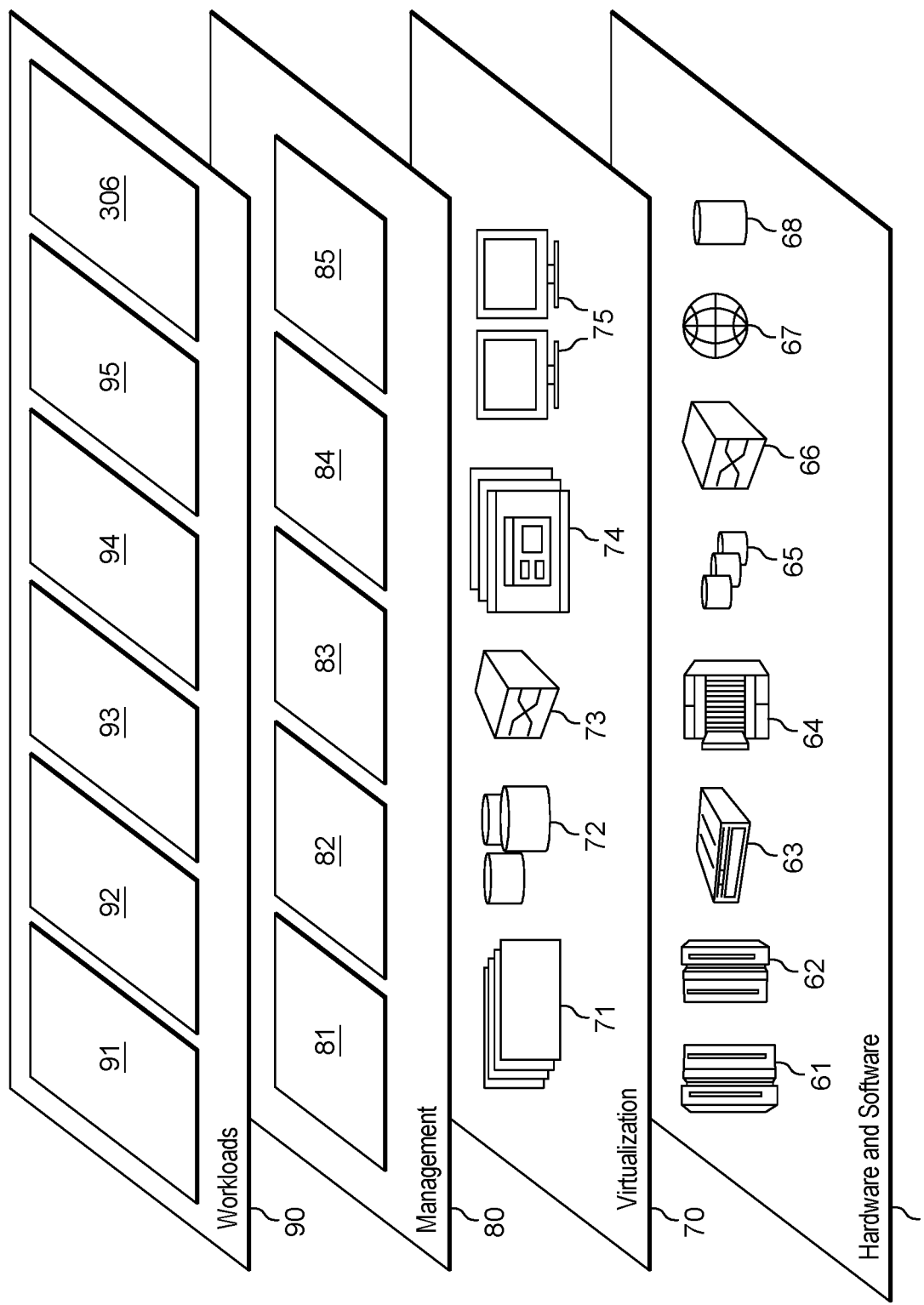
FIG. 7 depicts abstraction model layers, in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and brake condition monitoring program 306.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus for monitoring conditions of a braking system, the apparatus comprising:
    a brake pad with a friction material, a first plurality of light transmission fibers, and a first plurality of optical image fibers, wherein the first plurality of light transmission fibers and the first plurality of optical image fibers are positioned on top of a backing plate of the brake pad, wherein the friction material is positioned on top of the backing plate of the brake pad;
    a first end of each of the first plurality of light transmission fibers coupled to one or more light emitting-diodes and a second end of each of the first plurality of light transmission fibers directed towards a contact surface of a brake rotor; and
    a first end of each of the first plurality of optical image fibers coupled to an image sensor and a second end of each of the first plurality of optical image fibers directed towards the contact surface of the brake rotor, wherein the first plurality of light transmission fibers and the first plurality of optical image fibers are configured to capture an image of at least a section of the contact surface of the brake rotor.

2. The apparatus of claim 1, wherein the one or more light emitting-diodes are positioned and the image sensor are positioned in a remote sensor housing.

3. The apparatus of claim 1, wherein the one or more light emitting-diodes are infrared light emitting-diodes.

4. The apparatus of claim 1, the first plurality of light transmission fibers are configured to direct light towards the contact surface of the brake rotor and the first plurality of optical image fibers are configured to capture the light reflected off the contact surface of the brake rotor.

5. The apparatus of claim 1, further comprising:
a nozzle for positioned near the brake pad configured to direct air towards the first plurality of light transmission fibers and the first plurality of optical image fibers.

6. The apparatus of claim 1, further comprising:
a second plurality of light transmission fibers positioned on top of the backing plate of the brake pad; and
a first end of each of the second plurality of light transmission fibers are coupled to the one or more light emitting-diodes and a second end of each of the second plurality of light transmission fibers are directed towards the contact surface of the brake rotor.

7. The apparatus of claim 6, wherein the first plurality of optical image fibers is a row of optical image fibers positioned between a first row of the first plurality of light transmission fibers and a second row of the second plurality of light transmission fibers.

8. The apparatus of claim 7, wherein the row of optical image fibers, the first row of the first plurality of light transmission fibers, and the second row of the second plurality of light transmission fibers are positioned along a portion of a radius of the contact surface of the brake rotor.

9. The apparatus of claim 1, wherein the first plurality of light transmission fibers and the first plurality of optical image fibers are positioned in a cavity on top of the backing plate of the brake pad between a first portion of the friction material and a second portion of the friction material.

10. A method for brake conditions monitoring, the method comprising:
responsive to initializing an image sensor and one or more infrared light emitting-diodes, establishing, by one or more processors, a baseline measurement for each of one or more brake pads and one or more brake rotors utilizing a plurality of light transmission fibers coupled to the one or more infrared light emitting-diodes and a plurality of optical image fibers coupled to the image sensor;
sampling, by the one or more processors, each of the one or more brake pads and the each of the one or more brake rotors for assessment to establish sample readings;
processing, by the one or more processors, the sample readings for brake pad service projections and brake rotor service projections for each of the one or more brake pads and for each of the one or more brake rotors; and
displaying, by the one or more processors, the brake pad service projections and the brake rotor service projections for each of the one or more brake pads and for each of the one or more brake rotors, wherein the brake rotor service projections further include a rotor condition assessment.

11. The method of claim 10, wherein initializing the image sensor and the one or more infrared light emitting-diodes further comprises:
determining, by the one or more processors, whether connectivity is established with each of the plurality of light transmission fibers and each of the plurality of optical image fibers;
responsive to determining if connectivity is established with each of the plurality of light transmission fibers and each of the plurality of optical image fibers, identifying, by one or more processors, whether a value produced by the plurality of light transmission fibers and the plurality of optical image fibers are outside of an operating range; and
response to identifying the value produced outside of the operating range, displaying, by the one or more processors, a notification identifying a remote sensor head associated with the value produced outside of the operating range, wherein the value is associated with a first light transmission fiber from the plurality of light transmission fibers and a first optical image fiber from the plurality of optical image fibers.

12. The method of claim 10, wherein establishing the baseline measurement for each of one or more brake pads and one or more brake rotors further comprises:
responsive to each of the one or more brake pads interacting with a contact surface of each of the one or more brake rotors, determining, by the one or more processors, an initial friction material depth for each of the one or more brake pads utilizing a Time of Flight technique.

13. The method of claim 12, wherein the Time of Flight technique is based on light emitted by a single light transmission fiber reflecting off the contact surface of a single brake rotor toward a single optical image transmission fiber.

14. The method of claim 12, wherein sampling each of the one or more brake pads and the each of the one or more brake rotors for assessment further comprises:
responsive to each of the one or more brake pads interacting with the contact surface of each of the one or more brake rotors, determining, by the one or more processors, a current friction material depth for each of the one or more brake pads utilizing the Time of Flight technique.

15. The method of claim 14, wherein processing the sample readings for brake pad service projections further comprises:
comparing, by the one or more processors, the initial friction material depth to the current friction material depth; and
determining, by the one or more processors, a percentage change in friction material depth on the one or more brake pads due to wear.

16. The method of claim 15, wherein displaying the brake pad service projections and the brake rotor service projections further comprises:
determining, by the one or more processors, a rate of friction material wear based on a mileage travel and difference between the initial friction material depth and the current friction material depth; and
displaying, by the one or more processors, the brake pad service projections, wherein the brake pad service projections includes a mileage amount until each of the one or more brake pads require servicing.

17. The method of claim 10, wherein sampling each of the one or more brake pads and the each of the one or more brake rotors for assessment further comprises:

capturing, by the one or more processors, a plurality of images of a contact surface of each of the one or more brake rotors during a 360 degree rotation;
generating, by the one or more processors, a single image of each contact surface of each of the one or more brake rotors by compiling the plurality of images; and
performing, by the one or more processors, the assessment of each contact surface in each single image to identify one or more instances of scarring, cracking, warping, and excessive rusting.

18. The method of claim 17, further comprising:
comparing, by the one or more processors, each single image of each contact surface to a previously generated image to identify the one or more new instances of scarring, cracking, warping, and excessive rusting.

19. The method of claim 18, wherein displaying the brake pad service projections and the brake rotor service projections further comprises:
displaying, by the one or more processors, each single image of each contact surface, wherein one or more areas of each contact surface are highlighted to identify the one or more instances of potential scarring, cracking, warping, and excessive rusting.

* * * * *